United States Patent
Mizutani et al.

[11] 3,861,424
[45] Jan. 21, 1975

[54] ELASTIC FLEXIBLE HOSE

[75] Inventors: Tadashi Mizutani, Osaka; Soshiro Ono, Osa, both of Japan

[73] Assignee: Kuraray Plastics Co., Ltd., Osaka-shi, Japan

[22] Filed: May 8, 1973

[21] Appl. No.: 358,285

[30] Foreign Application Priority Data
May 11, 1972 Japan.......................... 47-55185[U]

[52] U.S. Cl.............. 138/119, 138/122, 138/DIG. 7
[51] Int. Cl............................................. F16l 11/08
[58] Field of Search .......... 138/134, 129, 132, 119, 138/121, 122, 127, DIG. 7, 137

[56] References Cited
UNITED STATES PATENTS

| | | | |
|---|---|---|---|
| 2,468,589 | 4/1949 | Cryor et al...................... | 138/138 X |
| 3,248,272 | 4/1966 | Sawada........................... | 138/122 X |
| 3,343,567 | 9/1967 | Mulligan et al.................. | 138/119 |
| 3,348,882 | 12/1970 | Rinker............................. | 138/132 |
| 3,479,670 | 11/1969 | Medell............................. | 138/129 X |
| 3,739,815 | 6/1973 | Rejeski............................ | 138/129 X |

FOREIGN PATENTS OR APPLICATIONS
836,407 6/1960 Great Britain..................... 138/122

*Primary Examiner*—Richard C. Queisser
*Assistant Examiner*—Daniel M. Yasich
*Attorney, Agent, or Firm*—Flynn & Frishauf

[57] ABSTRACT

An easily contracted elastic flexible hose comprises thin tubing and spiral reinforcement means. The thin tubing is tapered in its thickness in the longitudinal direction between two adjacent spiral turns of the reinforcement means so that the tubing may bend inwardly and form pleats, which pleats incline toward the axis of the hose and advance along the inner surface of the reinforcement means in its contracted form.

8 Claims, 8 Drawing Figures

PATENTED JAN 21 1975 3,861,424

3,861,424

ELASTIC FLEXIBLE HOSE

The present invention concerns a synthetic resin hose with excellent elasticity collapsibility and flexibility.

Flexible hoses comprising spiral reinforcing means made of hard synthetic resin and thin tubing made of soft synthetic resin are extremely light in weight and easy to handle and they are excellent in their bending property and in anti-abrasiveness. Accordingly, they have come to be widely used for air exhaust pipes, air feeding pipes, for ventilation purposes, dust collection purposes and for conveying various other fluid bodies. However, these type of hoses are defective in that they become bulkier as the inner diameter becomes bigger, thus causing inconveniences in handling and transportation and also increasing costs in packaging, transportation, and storage. There have been strong demands in the art to overcome these problems.

In order to obviate these problems, it was tried to shorten the length of the hose by providing big pleatings in the thin flexible pipe body so as to let the said thin flexible tubing protrude inwardly in the hose, or by making the intermediate part between spiral reinforcement bodies thinner. It was found that every hose when contracted in the longitudinal direction would cause waves in the thin flexible tubing and such waves would become fixed because of the properties of the synthetic resin used. This not only increases fluid resistance but also deteriorates the product value and service years.

The object of the present invention is to provide an elastic flexible hose having characteristics which obviate these defects of the prior art hoses.

SUMMARY OF THE INVENTION

According to the present invention, a flexible hose comprises a thin tubing of soft synthetic resin and spiral reinforcement means coupled thereto and made of hard synthetic resin. The improvement of the present invention resides in that the thickness of the tubing is tapered between maximum and minimum thickness portions, the tapers being always in one direction, between adjacent turns of the spiral reinforcement means so that the tube is bendable inwardly to form pleats when the hose is in its contracted state. The pleats incline in the direction of the axis of the hose toward the thinner ends of the tapers and extend along the inner surface of the spiral reinforcement means with the hose in its contracted state. The thin tubing has a substantially plain inner surface so that when the hose is in its extended state, the inner surface of the hose is likewise substantially

DETAILED DESCRIPTION OF ILLUSTRATED EMBODIMENTS

Figure 1:
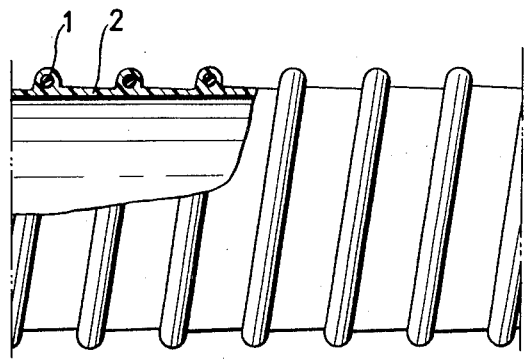
FIG. 1 is a partially fragmentary front view of one embodiment of a hose of the present invention in a stretched position.
Figure 2:
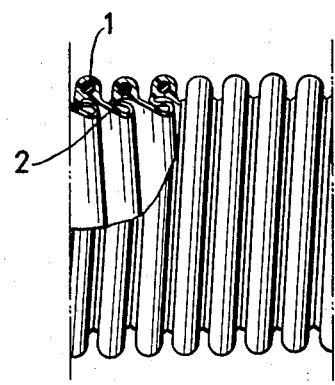
FIG. 2 is a partially fragmentary front view of a hose of the present invention in a contracted position.
Figure 3:
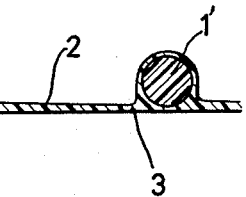
FIG. 3 is an enlarged sectional view of the fragmentary part shown in FIG. 1.
Figure 4:
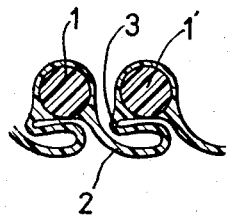
FIG. 4 is an enlarged sectional view of the fragmentary part shown in FIG. 2.
Figure 5:
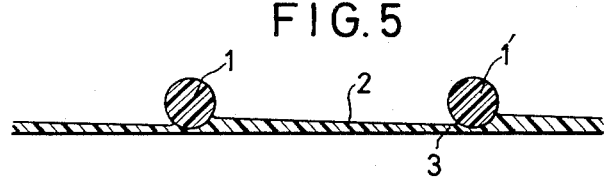
FIG. 5 is a fragmentary cross-sectional view of one embodiment of the hose of the present invention which has no soft synthetic resin coat over the reinforcement means.
Figure 6:
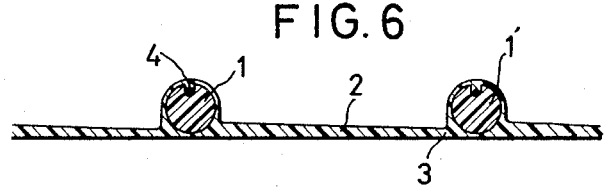
FIGS. 6 to 8 are fragmentary cross-sectional view of embodiments in which ground wires are buried or embedded in the hose in accordance with the present invention.
Figure 7:
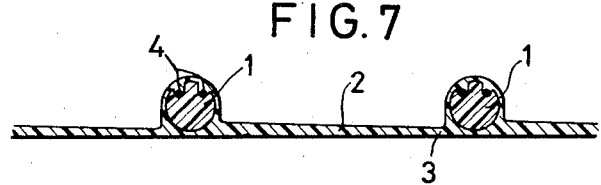
Figure 8:
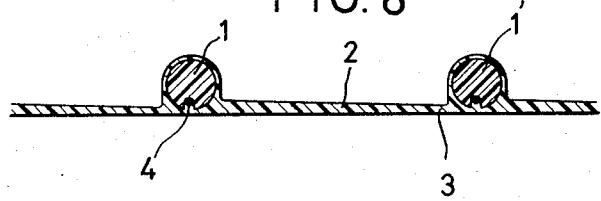

Referring to the drawings, and particularly to FIGS. 1 and 2, there is shown a hose in accordance with the present invention. The hose according to the present invention comprises, as is the case with conventionally known elastic hoses, a spiral reinforcement means 1 made of hard synthetic resin and protruding outwardly, and a thin elastic tubing 2 made of soft synthetic resin having an approximately flat inner surface when in a stretched position. The thickness of the said thin elastic tubing 2 substantially tapers down toward one direction between adjacent spiral turns of the reinforcing means 1 and 1'. (Refer to FIGS. 3 and 4). In other words, the portion having the least thickness is required to be located at a position nearer to the reinforcement means and not midway between the turn of the reinforcement means. The reinforcement means can either be covered with soft synthetic resin or not covered therewith. (Refer to FIG. 5). The degree of taper of the thickness is in a range of 0.05 – 0.45 mm, preferably in 0.15 – 0.45 mm and more preferably in 0.20 – 0.40 mm per unit length of 10 mm in the longitudinal direction, whereas the thickness of the thin elastic tubing at its thinnest part is more than 0.4 mm and less than 1.2 mm. As seen in FIGS. 2 and 4 when the hose is contracted in the longitudinal direction, the thin elastic tubing 2 bends inwardly to form a pleat at the part 3 where the least thickness is, or in the proximity of the reinforcement means 1', and gradually advances into the inside of the reinforcement means 1'. If the minimum thickness portion of the thin elastic tubing is less than 0.4 mm, the hose is not practically usable and if it is bigger than 1.2 mm, then pleats are not formed completely as has been mentioned before. A ground wire 4 may be buried in or adjacent to the reinforcement means for use in electrically grounding the hose. (Refer to FIGS. 6, 7 and 8).

One advantage of the hose of the present invention elastic- is that the length of the hose may be reduced to ⅓ or 1/5 of the original length when the hose is contracted in the longitudinal direction, thus requiring an extremely small space for storage and packing as compared to the conventional type hoses. A prior art hose having an inner diameter of 308 mm, an outer diameter of 320 mm, 35 mm pitches of reinforcement means and 10 m in length requires a space of 1.7 m³ for packing if the hose was piled in a double layer spiral. On the other hand, the hose of the present invention having equal dimensions will require only 0.28 m³, one-sixteenth the volume of the former since it may be quite easily reduced in length.

The second advantage of the present invention resides in the provision of a pipe where there is no wave generation and which does not act to spring back to its original form when contracted. That is to say, when the pipe is contracted and the thickness of thin elastic tubing made of soft synthetic resin gradually tapers off in one direction between the two adjacent reinforcement bodies, and the reinforcement means are spirally contacting each other, the thin elastic tubing protrudes inwardly within the hose in the form of pleats. Since the thickness of the thin elastic tubing between reinforcement means tapers toward one direction, the stress concentrates where there is the least thickness, causing the thin elastic tubing to bend inwardly and then advance along the inner surface of the reinforcement means. Thus, there is seen no waves on the thin elastic tubings and no force tending to bring back the original shape as is apparent from the shape it takes when contracted.

The third advantage of the present invention resides in the fact that the fluid passing through the hose is not subjected to increased resistance nor partial abrasion since the thin elastic tubing between reinforcing means is substantially flat when the hose is in a stretched position.

The fourth advantage of the present invention is accompanied by the first advantage of contracting the hose in the longitudinal direction with extreme ease and takes still smaller curvature than the conventional type flexible hose.

The previously mentioned wave may occur depending upon the degree of the taper of the tubing, average thickness of the tubing and/or properties of synthetic resin used. The less average thickness thereof may frequently cause such waves. According to the present invention, since the thickness of the flexible tubing gradually tapers in one direction, between adjacent reinforcing turns through the whole length of the hose, such waves hardly occur although the taper is not substantial.

What we claim is:

1. In a selectively extendable and contractible flexible hose comprised of a thin tubing made of soft synthetic resin defining an elongated passageway therein, and spiral reinforcement means made of hard synthetic resin coupled to said thin tubing and spirally wound about said elongated passageway, the improvement wherein:

the thickness of said tubing is tapered between maximum and minimum thickness portions always in one direction between adjacent turns of said spiral reinforcement means so that the tubing is bendable inwardly to form pleats of foldable resin material when the hose is in its contracted state, said pleats including in the direction of the axis of the hose toward the thinner ends of the tapers and extending folded along the inner surface of said hose in the vicinity of the spiral reinforcement means with the hose in its contracted state; and said thin tubing having a substantially plain inner surface.

2. A hose according to claim 1, wherein said spiral reinforcement means made of hard synthetic resin is coated with soft synthetic resin.

3. A hose according to claim 1, wherein the minimum thickness portions of the tubing of the hose are located adjacent to a reinforcement means.

4. A hose according to claim 1, wherein the degree of said taper is from 0.05 to 0.45 mm per unit length of 10 mm in the longitudinal direction of the hose; and the thickness of the tubing of the hose ranges from 0.4 to 1.2 mm at the minimum thickness portions thereof.

5. A hose according to claim 1, wherein the degree of said taper is from 0.15 to 0.45 mm per unit length of 10 mm in the longitudinal direction of the hose; and the thickness of the tubing of the hose ranges from 0.4 to 1.2 mm at the minimum thickness portions thereof.

6. A hose according to claim 1, wherein the degree of said taper is from 0.20 to 0.40 mm per unit length of 10 mm in the longitudinal direction of the hose; and the thickness of the tubing of the hose ranges from 0.4 mm to 1.2 mm at the minimum thickness portion thereof.

7. A hose according to claim 1 wherein the outer surface of said thin tubing between adjacent turns of said spiral reinforcement means is inclined so as to define said tapered portions, the inner surface of said tubing being substantially plain throughout.

8. A hose according to claim 1 wherein said reinforcing means is on the outer portion of said thin tubing.

* * * * *